(12) United States Patent
Tomsen et al.

(10) Patent No.: US 7,194,754 B2
(45) Date of Patent: Mar. 20, 2007

(54) METHOD AND SYSTEM TO DEFER TRANSACTIONS CONDUCTED VIA INTERACTIVE TELEVISION

(75) Inventors: Mai-Ian Tomsen, Seattle, WA (US); Anthony F. Istvan, Snoqualmie, WA (US)

(73) Assignee: Digeo, Inc., Kirkland, WA (US)

( * ) Notice: Subject to any disclaimer, the term of this patent is extended or adjusted under 35 U.S.C. 154(b) by 555 days.

(21) Appl. No.: 09/728,844

(22) Filed: Dec. 1, 2000

(65) Prior Publication Data

US 2002/0104086 A1 Aug. 1, 2002

Related U.S. Application Data

(60) Provisional application No. 60/236,422, filed on Sep. 28, 2000, provisional application No. 60/220,798, filed on Jul. 25, 2000.

(51) Int. Cl.
*H04N 7/16* (2006.01)
*H04N 7/173* (2006.01)

(52) U.S. Cl. .............. 725/60; 725/32; 725/51; 725/109; 725/110; 725/112

(58) Field of Classification Search .......... 725/60, 725/23, 32–36, 51, 109, 110, 112; 705/14, 705/26

See application file for complete search history.

(56) References Cited

U.S. PATENT DOCUMENTS

| | | | | |
|---|---|---|---|---|
| 5,410,326 A | * | 4/1995 | Goldstein | 348/734 |
| 5,504,519 A | * | 4/1996 | Remillard | 725/10 |
| 5,523,794 A | * | 6/1996 | Mankovitz et al. | 705/14 |
| 5,561,708 A | * | 10/1996 | Remillard | 379/93.19 |
| 5,661,517 A | * | 8/1997 | Budow et al. | 725/60 |
| 5,663,757 A | * | 9/1997 | Morales | 725/5 |

(Continued)

FOREIGN PATENT DOCUMENTS

WO WO 98/17064 4/1998

(Continued)

OTHER PUBLICATIONS

Tomsen, Mai-Ian, "Killer Content," copyright 2000 by Addison-Wesley, 225 pgs.

(Continued)

*Primary Examiner*—Chris Kelley
*Assistant Examiner*—Son P. Huynh
(74) *Attorney, Agent, or Firm*—Stoel Rives, LLP; Kory D. Christensen

(57) ABSTRACT

A viewer can initiate and then defer a transaction conducted via an interactive television system. The transaction can involve obtaining information or ordering goods or services available from a network, such as the Internet, that is accessible via the interactive television system. As an example, while the viewer is watching a television commercial, the viewer can begin a transaction to order a product advertised in the commercial. If for some reason the viewer does not complete the transaction by the time the commercial has finished broadcasting, the viewer can complete the transaction at a later time. A user input device is useable to initiate the transaction, to store information related to the transaction, and then to use the stored information to complete the transaction if the transaction has been previously deferred.

23 Claims, 9 Drawing Sheets

U.S. PATENT DOCUMENTS

| | | | |
|---|---|---|---|
| 5,745,556 A * | 4/1998 | Ronen | 379/127.05 |
| 5,764,899 A * | 6/1998 | Eggleston et al. | 709/203 |
| 5,819,034 A | 10/1998 | Joseph et al. | 395/200.31 |
| 5,864,610 A * | 1/1999 | Ronen | 379/121.01 |
| 5,864,823 A | 1/1999 | Levitan | |
| 5,884,141 A * | 3/1999 | Inoue et al. | 725/101 |
| 5,918,213 A * | 6/1999 | Bernard et al. | 705/26 |
| 5,960,411 A | 9/1999 | Hartman et al. | 705/26 |
| 6,029,045 A * | 2/2000 | Picco et al. | 725/34 |
| 6,032,130 A * | 2/2000 | Alloul et al. | 705/27 |
| 6,061,719 A * | 5/2000 | Bendinelli et al. | 709/218 |
| 6,064,420 A * | 5/2000 | Harrison et al. | 725/136 |
| 6,097,441 A * | 8/2000 | Allport | 348/552 |
| 6,104,334 A * | 8/2000 | Allport | 341/175 |
| 6,115,057 A * | 9/2000 | Kwoh et al. | 725/28 |
| 6,130,726 A * | 10/2000 | Darbee et al. | 348/734 |
| 6,141,006 A * | 10/2000 | Knowlton et al. | 705/26 |
| 6,177,931 B1 * | 1/2001 | Alexander et al. | 725/52 |
| 6,282,713 B1 * | 8/2001 | Kitsukawa et al. | 725/36 |
| 6,341,352 B1 * | 1/2002 | Child et al. | 726/1 |
| 6,460,020 B1 * | 10/2002 | Pool et al. | 705/26 |
| 6,484,011 B1 | 11/2002 | Thompson et al. | |
| 6,556,975 B1 * | 4/2003 | Wittsche | 705/26 |
| 6,567,984 B1 | 5/2003 | Allport | |
| 6,616,533 B1 * | 9/2003 | Rashkovskiy | 463/31 |
| 6,628,729 B1 * | 9/2003 | Sorensen | 375/316 |
| 6,637,032 B1 * | 10/2003 | Feinleib | 725/110 |
| 6,671,716 B1 * | 12/2003 | Diedrichsen et al. | 709/203 |
| 6,748,481 B1 * | 6/2004 | Parry et al. | 711/100 |
| 2001/0013125 A1 * | 8/2001 | Kitsukawa et al. | |
| 2001/0034668 A1 * | 10/2001 | Whitworth | 705/27 |
| 2002/0016965 A1 * | 2/2002 | Tomsen et al. | |
| 2002/0056109 A1 * | 5/2002 | Tomsen et al. | |
| 2002/0059590 A1 * | 5/2002 | Kitsukawa et al. | |
| 2002/0104086 A1 * | 8/2002 | Tomsen et al. | |
| 2002/0104090 A1 * | 8/2002 | Stettner | |
| 2002/0104099 A1 * | 8/2002 | Novak | |
| 2002/0124252 A1 * | 9/2002 | Schaefer et al. | |
| 2002/0194592 A1 * | 12/2002 | Tsuchida et al. | |
| 2002/0194593 A1 * | 12/2002 | Tsuchida et al. | |
| 2002/0194595 A1 * | 12/2002 | Miller et al. | |

FOREIGN PATENT DOCUMENTS

| | | | | |
|---|---|---|---|---|
| WO | WO 98/53611 | * | 11/1998 | 7/173 |
| WO | WO 00/24192 | | 4/2000 | |

OTHER PUBLICATIONS

Office Action mailed Oct. 7, 2003, for Application 09/834,043, filed Apr. 11, 2001.

* cited by examiner

1

METHOD AND SYSTEM TO DEFER TRANSACTIONS CONDUCTED VIA INTERACTIVE TELEVISION

CROSS-REFERENCE TO RELATED APPLICATIONS

The present application claims the benefit of U.S. Provisional Patent Application Ser. No. 60/220,798, filed Jul. 25, 2000, entitled "METHODS AND SYSTEMS FOR COMMERCE VIA INTERACTIVE TELEVISION" and U.S. Provisional Patent Application Ser. No. 60/236,422, filed Sept. 28, 2000, entitled "METHODS AND SYSTEMS FOR COMMERCE VIA INTERACTIVE TELEVISION," both of which are incorporated herein by reference.

BACKGROUND OF THE INVENTION

1. Field of the Invention

The present invention relates generally to commerce over a data communication network, and more particularly, to transactions involving goods and/or services conducted via an interactive television network having connectivity to the data communication network.

2. Background Information

An important business element in the production and distribution of television programming is revenue received from manufacturers and service providers who pay to advertise their products. The ubiquitous television commercial is the manifestation of this enterprise. The survival of a television program is heavily dependent on the advertising revenue that can be realized from the television program. Advertisers in turn rely on the ability of the television program to draw viewers who then become potential purchasers of the advertised products. An effective commercial is one that captures the viewer's attention in a lasting manner and that ultimately results in the purchase of goods and/or services.

Television and Internet technologies are beginning to converge. In particular, access to the World Wide Web via an Internet-enabled television system (sometimes referred to as "interactive television" or "enhanced television") is progressing and becoming more popular. Viewers can obtain information about goods and services that are advertised in commercials by, for example, connecting to the Internet while viewing interactive television and ordering the advertised products.

Television commercials do not always effectively reach the viewer for various reasons. For example, many viewers take the opportunity during the commercial break to do things other than watch the commercial, and as a result, the viewers may miss a commercial that may be of interest to them. Sometimes, the broadcast time of a commercial is insufficient to provide interested viewers with time to write down a telephone number or an address needed for purchasing the advertised product. Furthermore, even if commercials advertise a product that is of interest to viewers, the commercials can nevertheless be annoying to the viewers because the commercials interrupt or distract from the regular television program.

Accordingly, improvements are needed in the advertisement of products in commercials and in the conducting of transactions related to the advertised products.

SUMMARY OF THE INVENTION

According to an aspect of the invention, a method provides a broadcast segment as part of an interactive television transmission. The broadcast segment includes supplemental information. The method includes receiving a first command sent from a user input device to initiate a transaction, with the transaction being related to the supplemental information in the broadcast segment. The transaction is completed, subsequent to completion of displaying of the broadcast segment, in response to a second command received from the user input device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method and system for deferring transactions conducted via interactive television are described herein. In the following description, numerous specific details are provided, such as the description of system components in FIGS. 1–3, to provide a thorough understanding of embodiments of the invention. One skilled in the relevant art will recognize, however, that the invention can be practiced without one or more of the specific details, or with other methods, components, materials, etc. In other instances, wellknown structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention allows a viewer or user to initiate and then defer a transaction conducted via interactive television. For example, while the viewer is watching a television commercial, the viewer can begin a transaction to order an advertised product. After the television commercial has finished broadcasting, the viewer can complete the transaction. In one embodiment, the transaction can be initiated and completed via a user input device.

Figure 1:
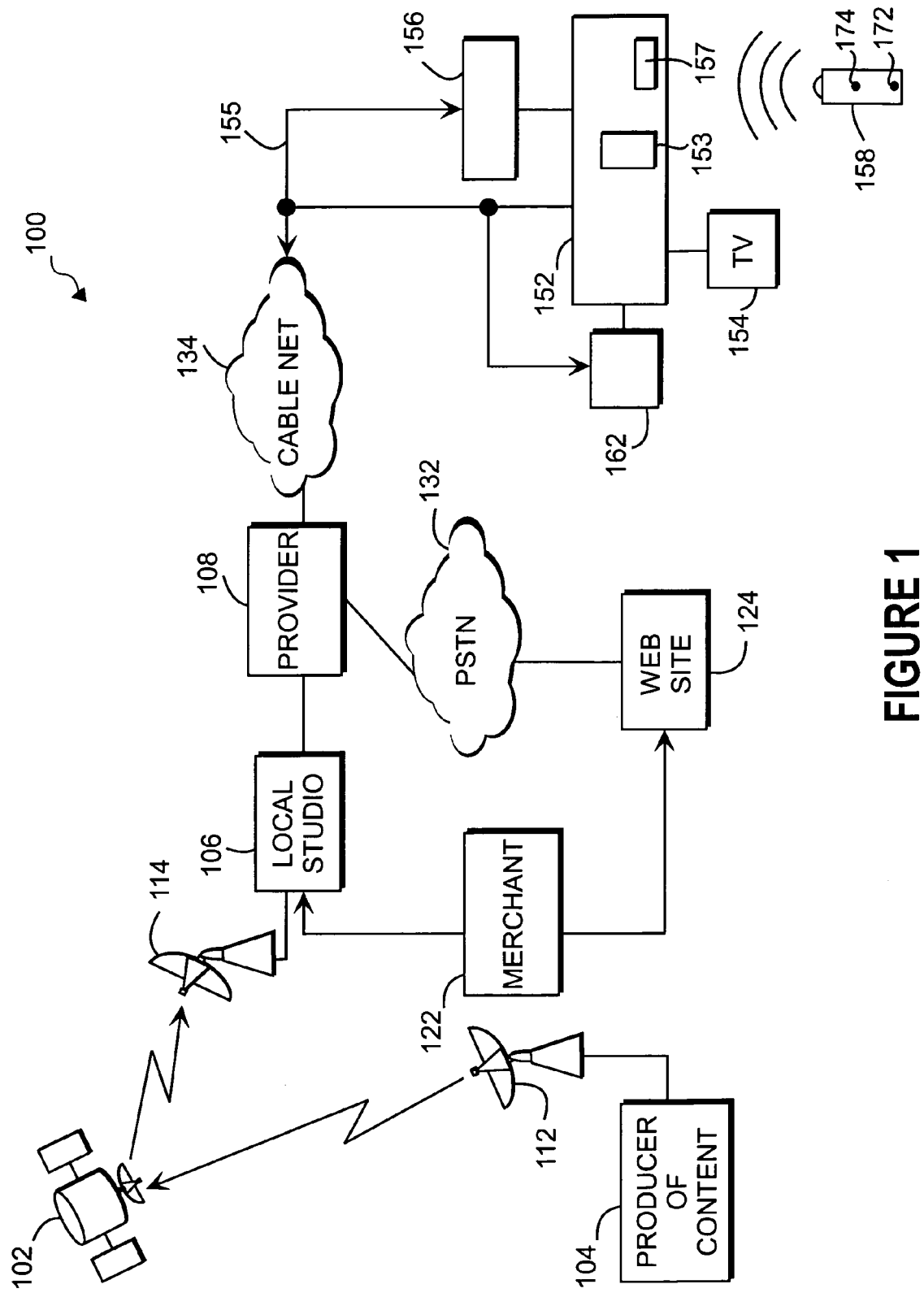
FIG. 1 shows an example of an interactive television system that can implement an embodiment of the invention.

FIG. 1 shows an example arrangement of an interactive television system 100 in accordance with an embodiment of the invention. A production company 104 produces programming content for transmission to viewers. The transmission is sent over an uplink channel to a satellite 102. The satellite 102 then transmits the programming content over a downlink channel to a local studio 106. The local studio 106 can insert additional programming (e.g., regional programming) and/or advertisements as needed into the programming content. The content with the insertions is then transmitted from the local studio 106 to a cable service provider 108. In an embodiment, the television program may be downloaded to a receiving station, such as a head-end (H/E) of the cable service provider 108, rather than or in addition to the local studio 106. A reverse channel from the cable service provider 108 to the local studio 106 is provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, located on the premises of a cable television subscriber, receives the programming content or television signal, and delivers the television signal to the subscriber's television set 154. Alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, etc. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware, as embodiments of the invention will work equally well using alternative reception and display arrangements.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission can occur via cable or satellite, and upstream data transmission can occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program to view and then delivers the television program to the television set 154. A storage unit 162 can also be coupled to or be a part of the set top box 152. The storage unit 162 can comprise a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

In accordance with an embodiment of the invention, a participating merchant list 153 may be maintained. As the name implies, this list permits participating merchants 122 to provide their product supplemental information to the viewer. The participating merchant list 153 may be provided to and stored in the set top box 152. Alternately or additionally, the participating merchant list 153 may be stored at a head-end or other system of the cable service provider 108, or at a third party system. In this embodiment, the participating merchant list 153 may operate as a "white" list which allows transmission of triggers from authorized merchants and filters out other triggers. In another embodiment, a "blocked" or "black" list may be maintained at the set top box 152 or elsewhere. Such a blocked list filters out undesirable triggers and may be created and/or maintained by the cable service provider 108. Alternately or additionally, such a blocked list may be edited by an end user.

Various techniques for carrying the product supplemental information can be used. For example, triggering, announcement, or resource information can be included and sent using the ATVEF standard, in a manner known by those skilled in the art. For instance, a uniform resource locator (URL) address can be embedded in the broadcast stream. Other standards that may be used include triggering mechanisms from Wink and WorldGate. Another technique is to embed code or a script in the stream that runs on the client (e.g., at the set top box 152) to provide the information and/or purchase experience.

Figure 2:
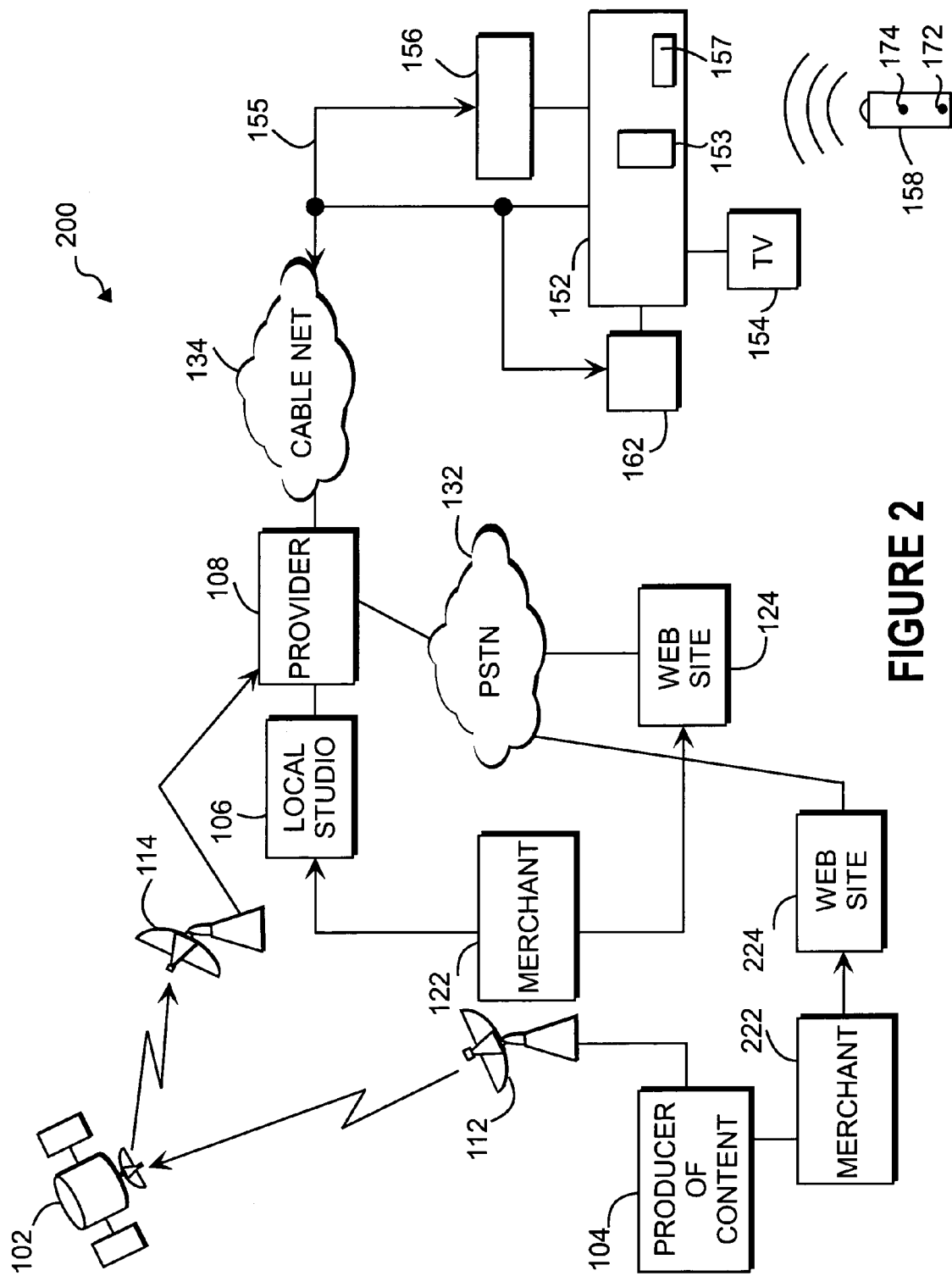
FIG. 2 shows an example of an interactive television system that can implement an embodiment of the invention.

As noted above, the triggers, resources, or announcements can be inserted by the originating broadcaster 104, a local broadcaster 106, or by the cable system operator 108. FIG. 2 shows another example of an interactive television system 200 and illustrates another point of insertion of the product supplemental information. Here, a merchant 222, operating a web site 224, is located such that commercial insertion is made prior to the uplink transmission to the satellite 102.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 3:
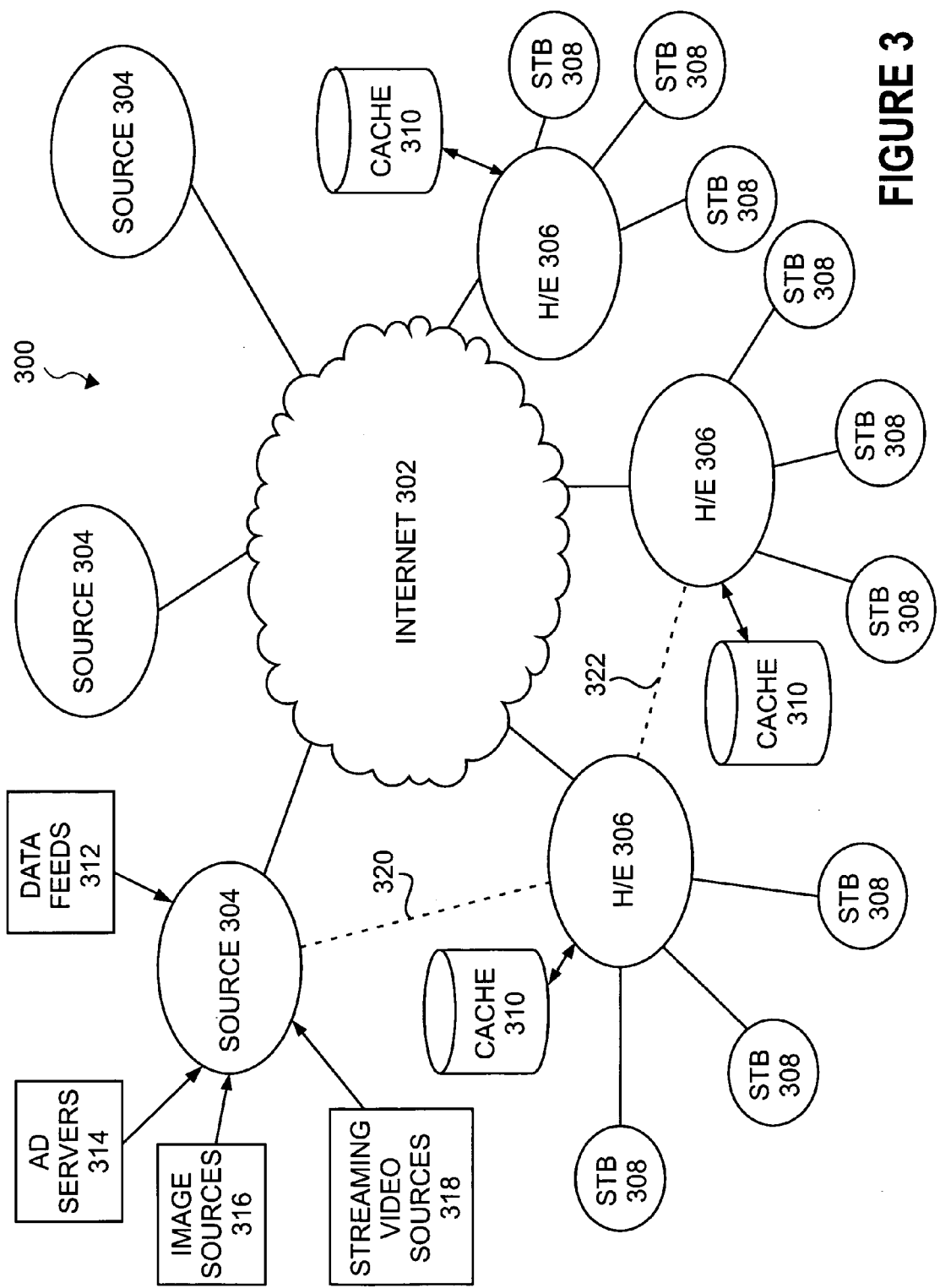
FIG. 3 shows an example of an interactive television system that can implement an embodiment of the invention.

FIG. 3 shows another example of an interactive television system 300 for distributing Internet content in addition to television content. The system 300 can be similar to or combined with the systems 100 and 200 shown in FIGS. 1 and 2, respectively. In accordance with an embodiment of the present invention, the system 300 can be integrated with a cable television distribution system. The system 300 includes an Internet 302, a plurality of content sources 304, a plurality of distribution centers (depicted as the head-ends or H/Es 306), and a plurality of client terminals 308 (depicted as set top boxes). In addition, a content source 304 is depicted as receiving data from data feeds 312, advertisement servers 314, image sources 316, and streaming video sources 318.

The plurality of content sources 304 is coupled to the Internet 302. For example, a content source 304 may comprise a web site portal such as Go2Net.com, or a news web site such as CNN.com, or other types of sources. Each content source 304 may have various data feeds 312, servers 314, and sources 316/318 coupled to it.

For example, news or stock quote feeds 312 may be fed into the content source 304. Servers 314 may provide advertisements for insertion into multimedia content delivered by the content source 304. Sources 316/318 may provide images 316, streaming video 318, and other content to the content source 304. Various other feeds, servers and sources may also be coupled to the content source 304 of FIG. 3, or coupled to the production company 104, cable network 134, web sites 124 and 224, or to other components of the systems shown in FIGS. 1 and 2.

The Internet 302 comprises a network of networks and is well known in the art. Communications over the Internet 302 can be accomplished using standard protocols such as transmission control protocol/internet protocol (TCP/IP), hypertext transfer protocol (HTTP), file transfer protocol (FTP), or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. One example of such an alternate path for communications is illustrated by a first dashed line 320 in FIG. 3. Alternately or additionally, peering connections may exist between distribution centers 306. One example of such peering is illustrated by a second dashed line 322 in FIG. 3. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

Figure 4:
FIGS. 4–7 illustrate an example of a transaction that can be conducted using the interactive television systems of FIGS. 1–3 according to an embodiment of the invention.
Figure 5:
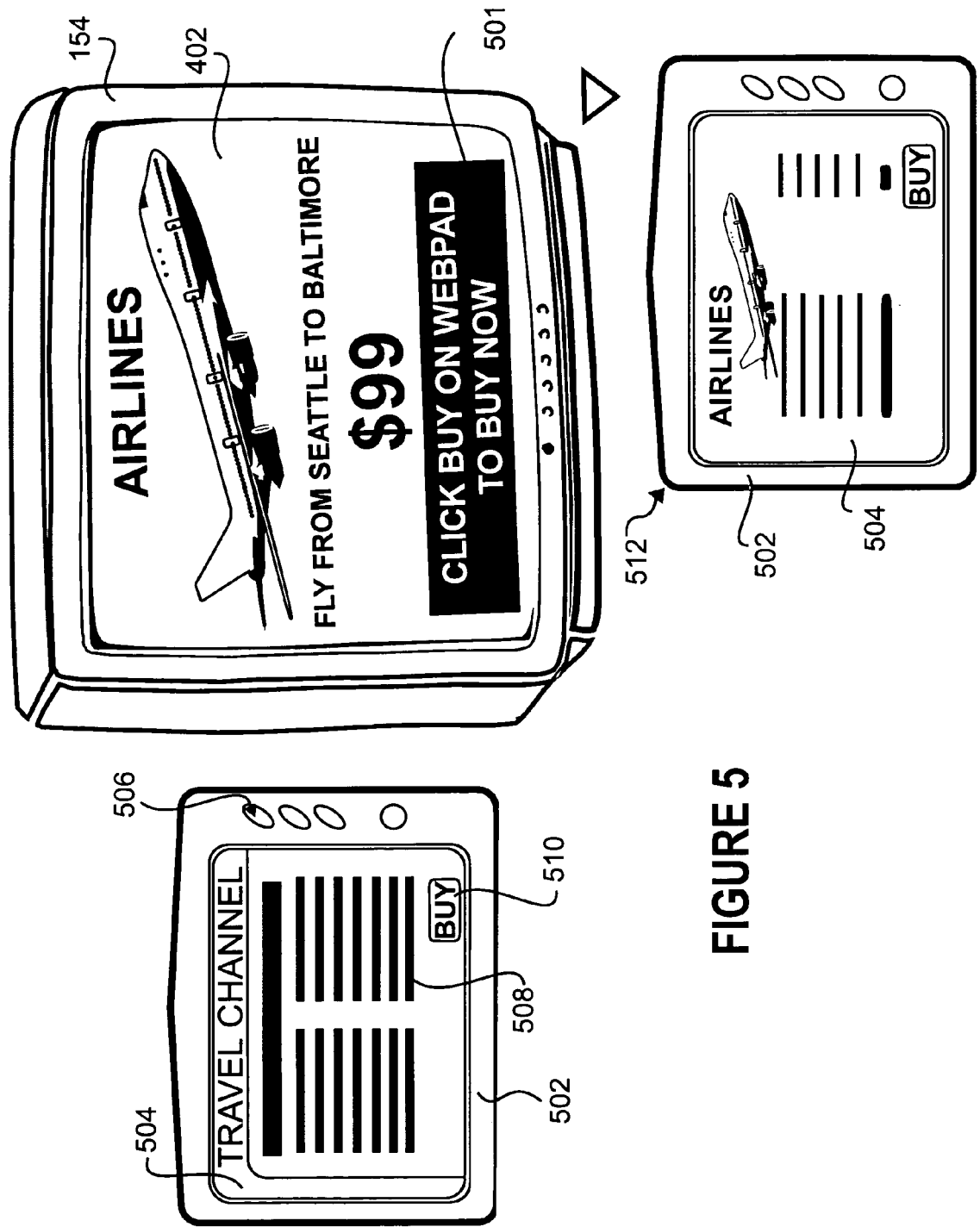

FIGS. 4–7 illustrate a transaction that can be conducted using the interactive television systems of FIGS. 1–3 according to an embodiment of the invention. In FIG. 4, a broadcast segment (such as a television commercial 402) is displayed on the television set 154 for viewing by a viewer. In the example shown in FIG. 4, the television commercial 402 is an advertisement for airline tickets, and it is to be appreciated that other types of broadcast segments may be displayed, such as public service announcements, previews of upcoming programming, "infommercials," or other programming that can be displayed as part of an interactive television transmission. Furthermore, the broadcast segments or the interactive television transmission need not be live, and may be pre-recorded, played from a VCR, buffered prior to display, etc. or any suitable combination of these methods.

The television commercial 402 may have an audio or visual (or both) indicator 404 to indicate the availability of enhanced content (e.g., product supplemental information), which the viewer can access using a viewer input device. In the example shown in FIG. 4, the indicator 404 is a "Buy" button that invites the viewer to buy airline tickets. The indicator 404 may be an "Info" button that provides information, there may be multiple indicators 404, or one or more indicators may be used for a combination of purposes (e.g., buying, requesting information, turning enhanced content on/off, activating a menu, etc.), according to various embodiments.

Activation of the indicator 404, by pressing a buy button 174 or an information button 172 of the remote control unit 158 shown in FIGS. 1–2, according to one embodiment, initiates a transaction associated with the television commercial 402 by sending a command to the set top box 152 to initiate the transaction. In another embodiment shown in FIG. 5, a user input device (hereinafter referred to as a "webpad" 502) can be used for the transaction in addition to or instead of the remote control unit 158. In one embodiment, the webpad 502 can be a wireless device that includes a display screen 504 and a plurality of controls/buttons 506 disposed on a frame of the webpad 502. In another embodiment, the display screen 504 can be a "touch screen."

The display screen 504 displays product supplemental information or content 508 that is associated with the television commercial 402. The content 508 can be transmitted to the webpad 502 from the set top box 152 and then displayed on the display screen 504, subsequent to activation of the indicator 404 in one embodiment. In another embodiment, the content 508 displayable on the display screen 504 can be automatically transmitted from the set top box 152 to the webpad 502 while the television commercial 402 is playing (e.g., without requiring prior activation of the indicator 404 by the viewer). The television commercial 402 can display a prompt 501 that instructs the viewer to continue with the transaction. In the example shown in FIG. 5, the prompt 501 states "Click BUY on webpad to buy now," and in response, the viewer can respond by pressing/activating a buy button 510 on the webpad 502, which sends a command to the set top box 152 to initiate or continue the transaction. Subsequently, the viewer can continue the transaction via the display screen 504 of the webpad 502 (shown at 512 in FIG. 5), without the various transaction information/displays having to be concurrently displayed along with the television commercial 402 on the television set 154.

Figure 6:
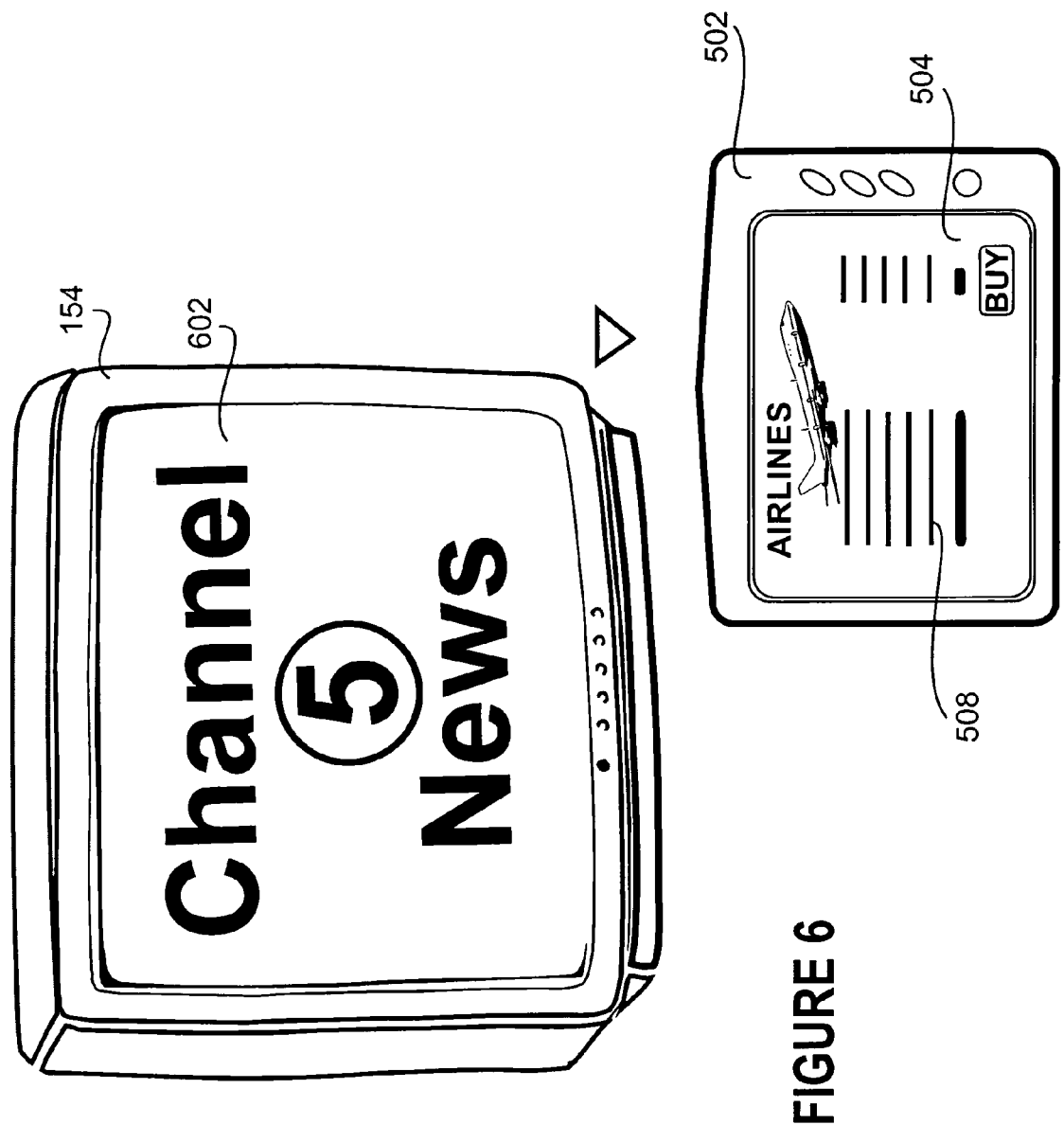

FIG. 6 illustrates a situation where regular programming 602 resumes (e.g., the television commercial 402 ends prior to completion of the transaction to buy the airline tickets). Such a situation may occur, for example, if the transaction requires more time to complete than is available during the broadcast of the television commercial 402, the viewer had taken a momentary break, etc. While the viewer is watching the regular programming 602 (e.g., the evening news), the webpad 502 stores the content 508.

Figure 7:
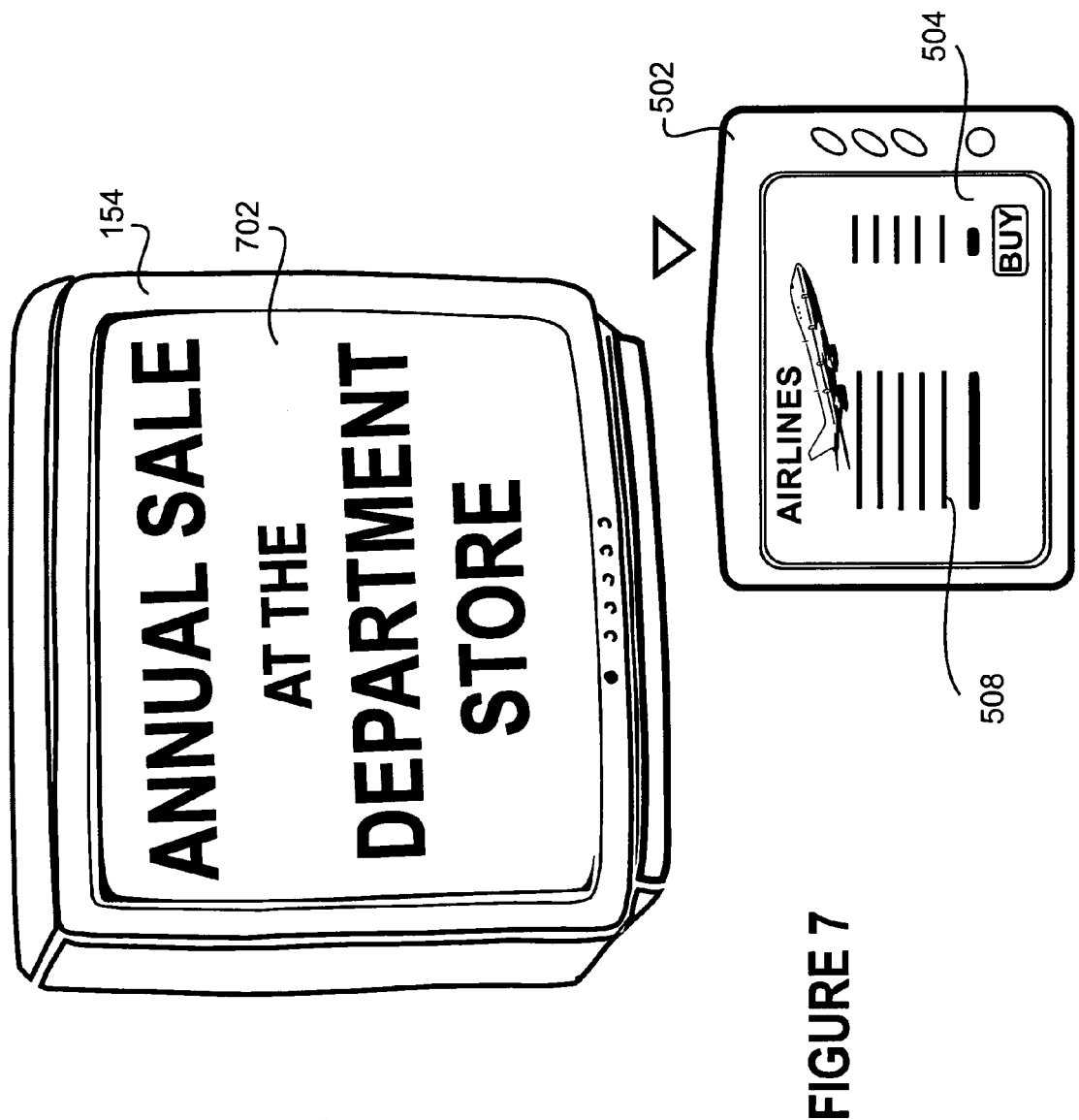

FIG. 7 illustrates a subsequent situation when another television commercial 702 is displayed. At this time, the viewer may complete the prior-initiated transaction for the airline tickets, using the webpad 502 in one embodiment, by pressing one of the controls 506 to send a command to the set top box 152 to resume and subsequently complete the transaction. In other embodiments, the viewer can complete that transaction during the broadcast/display of the regular programming 602, during the broadcast of other television commercials, or during other times.

In one embodiment, the information used for completion in FIG. 7 of the prior-initiated transaction can include accessing and obtaining buffered/stored content from storage location(s) in the webpad 502, in the set top box 152, in the interactive television systems 100, 200, 300 of FIGS. 1–3, or from storage location(s) in other suitable locations. Reconnection and/or requests from the set top box 152, or from the webpad 502, to the Internet can be made, in one embodiment, if the content needed for the transaction has not been previously buffered or cached. This allows the viewer to receive additional display content 508, URLs, or other information useable for completion of the transaction. Reconnection to the Internet (or use of an existing connection to the Internet) also allows the viewer's webpad 502, set top box 152, television set 154, etc. to send information or commands to a server or web site associated with the sponsor/originator of the television commercial 402, thereby allowing transmission of the viewer's selection(s) or input related to the transaction.

Although FIGS. 4–7 illustrate an example when several actions are conducted to eventually complete a transaction to purchase airline tickets, for example, it is understood that an embodiment of the invention may be used to defer any single action which may be a part of an overall transaction. That is, a portion of a transaction may involve connection to a web site, while another portion of the transaction may involve obtaining information prior to submitting an order. These individual actions may be deferred and completed individually, or completed in groups. Furthermore, it is possible to "stagger" the deferrals across a period of time, rather than deferring and/or completing all individual actions in just a single instance.

It is also understood that transactions may be "completed" after being deferred, without necessarily resulting in an ultimate purchase of the advertised product. That is, if after resuming the transaction after deferral, the viewer decides not to purchase the product, the viewer can press a "Cancel" button or simply stop conducting the transaction. In such a case, the transaction is "completed" even though the advertised product was not ultimately purchased. Also, it is also understood that "completion of a transaction" does not necessarily include subsequent events such as delivery of the ordered product to the viewer via U.S. mail, mailing of receipts electronically or in hard copy form, etc. In addition, it is possible to initiate multiple transactions and then to defer one or more of these transactions, in a manner similar to a "shopping cart" method. Subsequently, one or more of these transactions may be completed. Accordingly, FIGS. 4–7 illustrate only one example of how to defer transactions, and other ways to defer transactions or portions of transactions are possible.

Figure 8:
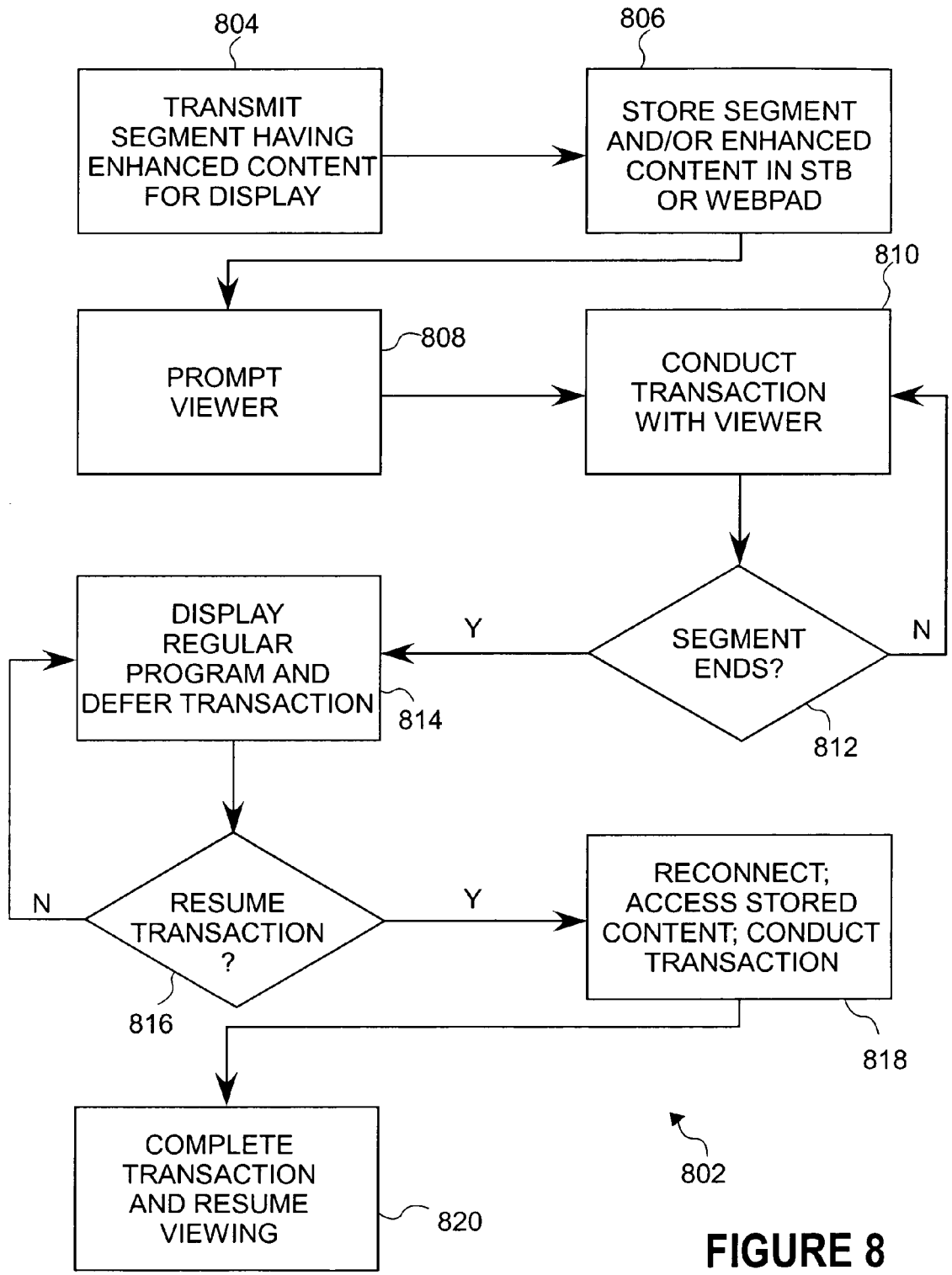
FIG. 8 is a flow diagram illustrating an example of a sequence of events during a transaction conducted via the interactive television systems of FIGS. 1–3 according to an embodiment of the invention.

FIG. 8 is a flow diagram 802 illustrating an example of a sequence of events to initiate and complete a transaction according to an embodiment of the invention. The elements of the flow diagram 802 can be implemented, in whole or in part, by machine-readable instructions, software, code, etc. that is stored in one or more machine-readable storage media. The machine-readable storage media can be located in the set top box 152, in the webpad 502, in another device coupled to the television set 154, in one or more servers in the systems shown in FIGS. 1–3, or in any suitable combination of these locations.

Beginning at 804, television programming is sent to the set top box 152. The television programming can include one or more broadcast segments, such as the television commercial 402 that includes enhanced content or product supplemental information that can be displayed on the television set 154. At 806, the broadcast segment, and/or its associated enhanced content that is useable for a potential transaction, can be buffered/stored/cached. Examples of the information that can be stored include web pages, URLs, templates having product order forms or ordering instructions, control and communication data useable for conducting the transaction, data associated with triggers and announcements, etc. In one embodiment, this storage can occur in conjunction with the reception of the segment and independently of viewer action via the remote control unit 158 or via the webpad 502. In another embodiment, this storage can be in response to and triggered by viewer action that sends a command to the set top box 152, such as when the viewer hits the buy button 174 or the information button 172 of the remote control unit 158, or by using one of the controls 506 of the webpad 504.

At 808, one or more prompts 501 can be displayed on the television set 154 to prompt the viewer to conduct the transaction via the webpad 502, and in response, the viewer can use the web pad 502 to send a command to initiate or continue the transaction. The transaction is conducted at 810, which can include activities such as providing the viewer with access to URLs, receiving transaction information or commands from the viewer, sending information related to the transaction to the viewer, etc.

At 812, an embodiment of the invention monitors if the television commercial 402 has ended and/or whether the transaction is completed. If not, then the transaction is allowed to continue at 810. If the television commercial 402 has ended at 812, then the regular television programming is displayed and the transaction is deferred at 814. Deferral of the transaction at 814 can occur in several non-exhaustive ways: automatically upon ending of the television commercial 402, upon receipt of a command from the viewer to defer the transaction (e.g., sent via the webpad 502), after lapsing of an amount of inactive time since the last viewer input was received, etc.

The information associated with the incomplete transaction is stored, and activity is monitored at 816 for an indication of whether the transaction can be taken off its deferred state. This activity that is indicative of a possible continuance of the transaction can include, for example, the beginning of the next commercial break, receiving a signal/command from the viewer to resume the transaction (sent via the webpad 502), displaying a prompt on the television set 154 that requests the viewer to complete the transaction and then receiving a command from the viewer in response to the prompt, etc. If such activities are not detected, then deferral of the transaction and display of the regular programming continues at 814.

If activity is detected at 816 indicating that the transaction can resume, then the transaction is allowed to be conducted at 818. Reconnection to the Internet and/or to the relevant web pages related to the transaction can occur at 818, as well as access and retrieval of stored content for the transaction. If necessary, filtering or suppression of triggers, announcements, resources, and other data related to the currently displayed television program or television commercial can also be implemented at 818, so as not to interfere with the resumed transaction. Such filtering or suppression, including the stripping of triggers, can be performed by a multiple system operator (MSO), components of the set top box 152, or by other components in the systems shown in FIG. 1–3 or at the client/viewer side. At 820, the transaction is completed, and television programming continues to be sent to the set top box 152 for viewing by the viewer.

Figure 9:
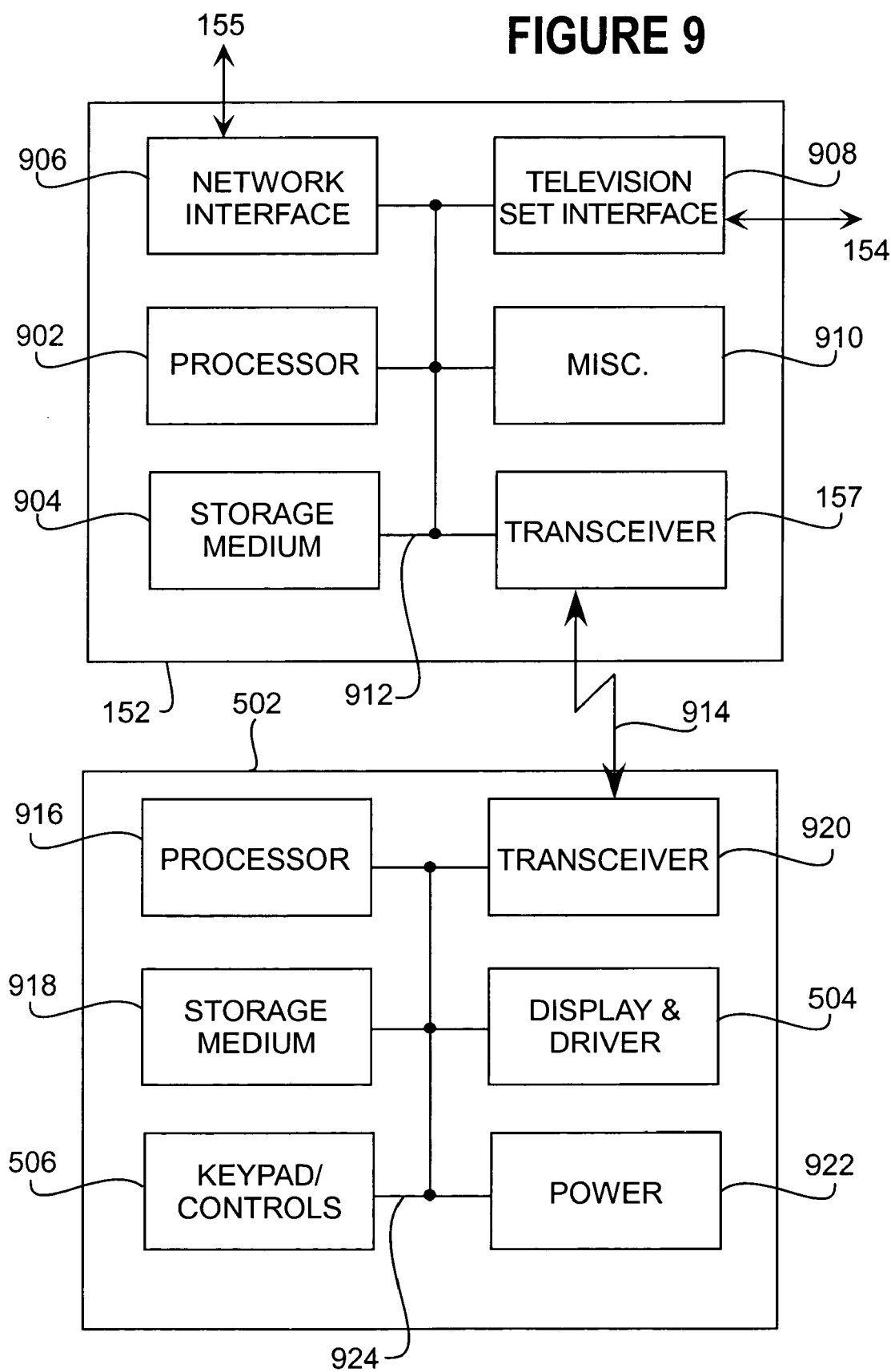
FIG. 9 are block diagrams of a set top box and a user input device that can be used in connection with the embodiments shown in FIGS. 1–8.

FIG. 9 shows block diagrams of embodiments of the set top box 152 and the webpad 502. The set top box 152 includes a processor 902 to read and execute software, machine-readable instructions, code, or other information stored in a machine-readable storage medium 904, or to perform other functions to control operation of components of the set top box 152. The information stored by the storage medium 904 can include software to operate the set top box 152, network communication software, cached/buffered Internet content (such as URLs, web pages, transaction templates, applets, etc.), user input information exchanged with the webpad 152 (such as instructions to initiate, defer, or complete a transaction), and other information. Suitable examples of the storage medium 904 (and its associated hardware) can include types of random access memory (RAM), read-only memory (ROM), buffers, caches, magnetic tape, disk drives, compact disks (CDs), digital versatile disks (DVDs), and the like.

The set top box 152 can further include a network interface 906 to communicate with the cable network 134 and/or the Internet via the communication link 155. A television set interface 908 provides a communication interface with the television set 154. The transceiver 157 allows communication with the webpad 502 via a wireless or hardwire communication link 914. The communication link 914 can include IR, RF, optical, twisted pair, coaxial, or other types of suitable media. Miscellaneous components 910 of the set top box 152 can include various controls (e.g., television set volume, picture, color controls, etc.), hardware, and software related to operation of the set top box 152, which for the sake of simplicity are not described in further detail herein because they would be familiar to those skilled in the art having the benefit of this disclosure. Components of the set top box 152 are coupled to each other via one or more busses 912.

The webpad 502 includes a processor 916 and a machine-readable storage medium 918, which can comprise (including its associated hardware) types of RAM, ROM, buffers, caches, magnetic tape, disk drives, CDs, DVDs, and the like. According to an embodiment, the storage medium 918 can store web pages, URLs, transaction templates, or other content that is storable when the viewer is conducting and/or deferring a transaction such as those described above. The storage medium 918 can also store other machine-readable instructions, code, or software that can be used by the processor 916 to control operation of components of the webpad 502 and/or for communication with the set top box 152.

A transceiver 920 allows communication with the transceiver 157 of the set top box 152 via the communication link 914. The webpad 502 also includes the display 504 and its driver, the controls 506 (e.g., keypad or buttons) to allow the viewer to enter information and selections, and a power supply 922. One or more busses 924 couple these components together. The display 504 may comprise a touch screen to include functionality of the controls 506 via on-screen controls.

In one embodiment, the webpad 502 can communicate with the Internet by transmitting signals to and receiving signals from the set top box 152, which can have connectivity to the Internet. In another embodiment, the webpad 502 can communicate directly with the Internet, such as via its own wireless or hardwire connection to the Internet, without having to route its communications with the Internet through the set top box 152.

In conclusion, the viewer can initiate and then defer a transaction conducted via interactive television systems such as those shown in FIGS. 1-3. The transaction can involve obtaining information or ordering goods/services available from the Internet via the interactive television system. As an example, while the viewer is watching the television commercial 402, the viewer can initiate a transaction to order a product advertised in the television commercial 402. If for some reason the viewer does not complete the transaction by the time the television commercial 402 has finished broadcasting, the viewer can complete the transaction at a later time. The webpad 502 is useable to initiate the transaction, to store information related to the transaction, and then to use the stored information to complete the transaction if the transaction has been previously deferred.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while the webpad 502 has been described herein as a wireless device, it is to be appreciated that other devices can provide features that are similar to those provided by the webpad 502. For instance, a laptop computer, a PC, or an electronic book device coupled to the set top box 152 may be used in one embodiment as the user input device for deferring transactions. The webpad 502, the laptop computer, or the PC may be coupled to the set top box 152 in a wireless or hardwire manner.

As another example, transactions other than those related to commercials may be deferred in one embodiment of the invention. That is, a regular television program can make available enhanced content that is related to the television program (e.g., while watching a football game, the viewer is presented with an indicator to indicate that statistics about a particular player are available via the Internet). The viewer can access the enhanced content while the television program is being displayed, begin a transaction related to the enhanced content, and then defer the rest of the transaction at a later time, such as during the next commercial break.

As yet another example, although the webpad 502 has been described herein as a device useable for initiating, deferring, and completing transactions, it is to be appreciated that in one embodiment, the webpad 502 can be used in other ways. A viewer can use the webpad 502 to navigate through a purchase experience for a particular product on any platform supported by the interactive television systems shown in FIGS. 1–3, or to perform web browsing to access various web sites available through these interactive television systems. The webpad 502 can be used with multiple devices, and provides an interface to commerce tools available through the systems shown in FIGS. 1–3, including shopping cart, wallet, and purchase experience windows. The webpad 502 may also be used with a high-resolution screen to read an electronic book or article. Such a book or article may be downloaded to the webpad 502 and stored therein.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   receiving a broadcast segment including supplemental information as part of an interactive television transmission;
   displaying the broadcast segment with an indication that a transaction related to the supplemental information is available;
   receiving a user command to initiate the transaction;
   partially conducting the transaction while the broadcast segment is in progress;
   automatically deferring the transaction to be completed at a later time; and
   automatically resuming the transaction without any affirmative user action, wherein automatically resuming comprises automatically resuming the transaction at a beginning of a subsequent broadcast segment.

2. The method of claim 1, wherein automatically deferring comprises automatically deferring the transaction in response to completion of the broadcast segment.

3. The method of claim 1, wherein automatically deferring comprises automatically deferring the transaction in response to a particular amount of inactive time lapsing since user input was last received.

4. The method of claim 1, wherein automatically deferring comprises storing the supplemental information independently of user action.

5. The method of claim 1, wherein automatically deferring comprises storing the supplemental information within a remote control device for subsequent retrieval in order to complete the deferred transaction.

6. The method of claim 1, wherein the broadcast segment comprises a television commercial.

7. The method of claim 1, further comprising suppressing an indication of a new transaction associated with a currently-displayed broadcast segment in response to resuming a deferred transaction.

8. The method of claim 7, wherein suppressing comprises filtering a trigger associated with the new transaction.

9. A system comprising:
   a transceiver to receive a broadcast segment including supplemental information as part of an interactive television transmission;
   a display unit to display the broadcast segment with an indication that a transaction related to the supplemental information is available;
   a remote control device to receive a user command to initiate the transaction; and
   a processor to partially conduct the transaction while the broadcast segment is in progress, to automatically defer the transaction to be completed at a later time, and automatically resume the transaction without any affirmative user action, wherein the processor is to automatically resume the transaction at a beginning of a subsequent broadcast segment.

10. The system of claim 9, wherein the processor is to automatically defer the transaction in response to completion of the broadcast segment.

11. The system of claim 9, wherein the processor is to automatically defer the transaction in response to a particular amount of inactive time lapsing since user input was last received.

12. The system of claim 9, wherein the processor is to store the supplemental information independently of user action upon deferring the transaction.

13. The system of claim 9, wherein the processor is to store the supplemental information within the remote control device.

14. The system of claim 9, wherein the broadcast segment comprises a television commercial.

15. The system of claim 9, wherein the processor is to suppress an indication of a new transaction associated with a currently-displayed broadcast segment in response to resuming a deferred transaction.

16. The system of claim 15, wherein the processor is to suppress the new transaction by filtering a trigger associated with the new transaction.

17. A method comprising:
   receiving and displaying a broadcast segment including supplemental information as part of an interactive television transmission;
   receiving a first user command to initiate a transaction related to the supplemental information;
   partially conducting the transaction;
   deferring the transaction in response to a second user command; and
   automatically resuming the transaction at a beginning of a subsequent broadcast segment without any affirmative user action.

18. The method of claim 17, wherein deferring comprises storing the supplemental information independently of user action.

19. The method of claim 17, wherein deferring comprises storing the supplemental information within a remote control device for subsequent retrieval in order to complete the deferred transaction.

20. The method of claim 17, wherein the broadcast segment comprises a television commercial.

21. A method comprising:
receiving and displaying a broadcast segment including supplemental information as part of an interactive television transmission;
receiving a first user command to initiate a transaction related to the supplemental information;
partially conducting the transaction;
deferring the transaction in response to a second user command;
storing the supplemental information within a remote control device for subsequent retrieval in order to complete the deferred transaction; and
automatically resuming the transaction without any affirmative user action, wherein automatically resuming comprises automatically resuming the transaction at a beginning of a subsequent broadcast segment.

22. The method of claim 21, further comprising retrieving the stored supplemental information from the remote control device when the transaction is to be resumed.

23. A method comprising:
receiving a television commercial together with supplemental information for conducting a transaction as part of an interactive television transmission;
displaying the television commercial with an indication that the transaction is available;
receiving a user command to initiate the transaction;
partially conducting the transaction while the television commercial is in progress;
automatically prompting a user to defer the transaction in response to completion of the television commercial;
deferring the transaction in response to a subsequent user; and
automatically resuming the transaction without any affirmative user action, wherein automatically resuming comprises automatically resuming the transaction at a beginning of a subsequent broadcast segment.

* * * * *